US006880805B2

(12) United States Patent
Ortega, Jr. et al.

(10) Patent No.: US 6,880,805 B2
(45) Date of Patent: Apr. 19, 2005

(54) TRIM INSTALLATION HARDWARE

(75) Inventors: Indalecio Ortega, Jr., Lakewood, CA (US); Mark S. Bloom, Mission Viejo, CA (US)

(73) Assignee: Newfrey LLP, Newark, DE (US)

( * ) Notice: Subject to any disclaimer, the term of this patent is extended or adjusted under 35 U.S.C. 154(b) by 0 days.

(21) Appl. No.: 10/425,486

(22) Filed: Apr. 29, 2003

(65) Prior Publication Data

US 2004/0011987 A1 Jan. 22, 2004

Related U.S. Application Data

(60) Provisional application No. 60/377,009, filed on Apr. 30, 2002.

(51) Int. Cl.[7] .............................................. F16K 31/60
(52) U.S. Cl. ...................................... 251/291; 137/359
(58) Field of Search ......................... 251/100, 291–293; 137/359

(56) References Cited

U.S. PATENT DOCUMENTS

| | | | |
|---|---|---|---|
| 1,491,077 A | | 4/1924 | Beerworth |
| 2,858,846 A | | 11/1958 | Parker |
| 3,582,116 A | | 6/1971 | Young |
| 3,693,647 A | | 9/1972 | Saar |
| 3,916,939 A | * | 11/1975 | Gillard ........................ 137/296 |
| 4,062,375 A | * | 12/1977 | Byrnes ........................ 137/296 |
| 4,577,830 A | * | 3/1986 | Winegeart ..................... 251/84 |
| 4,702,275 A | | 10/1987 | Ballun et al. |
| 4,817,663 A | | 4/1989 | McAndrew |
| 5,220,942 A | | 6/1993 | Garvin, Jr. et al. |
| 5,257,645 A | * | 11/1993 | Scully et al. ................. 137/359 |
| 5,738,140 A | | 4/1998 | Mann |
| 5,860,634 A | | 1/1999 | Marty et al. |
| 5,947,149 A | * | 9/1999 | Mark .......................... 137/359 |
| 6,257,551 B1 | | 7/2001 | Veiga |
| 6,260,932 B1 | * | 7/2001 | Tinklepaugh ................. 303/18 |
| 6,263,903 B1 | | 7/2001 | Sjöberg |
| 6,279,604 B1 | | 8/2001 | Korb et al. |
| 6,352,239 B1 | | 3/2002 | McIntosh et al. |

* cited by examiner

Primary Examiner—Paul J. Hirsch
(74) Attorney, Agent, or Firm—Richard J. Veltman; John D. DelPonti

(57) ABSTRACT

A Roman tub installation includes a hub and handle assembly, a valve, a sleeve coupled to the valve's body, a stem adapter coupled to the valve's stem and to the hub and handle assembly, and a threaded collar coupled to the sleeve. The hub and handle assembly includes a hub having a threaded portion for engaging the threaded collar, thereby coupling the hub and handle assembly to the sleeve and valve body, and a handle disposed adjacent the hub. A handle stem extends from the handle and couples the handle to the stem adapter. The stem adapter couples the handle's stem to the valve's stem, thereby coupling the handle to the valve stem.

11 Claims, 3 Drawing Sheets

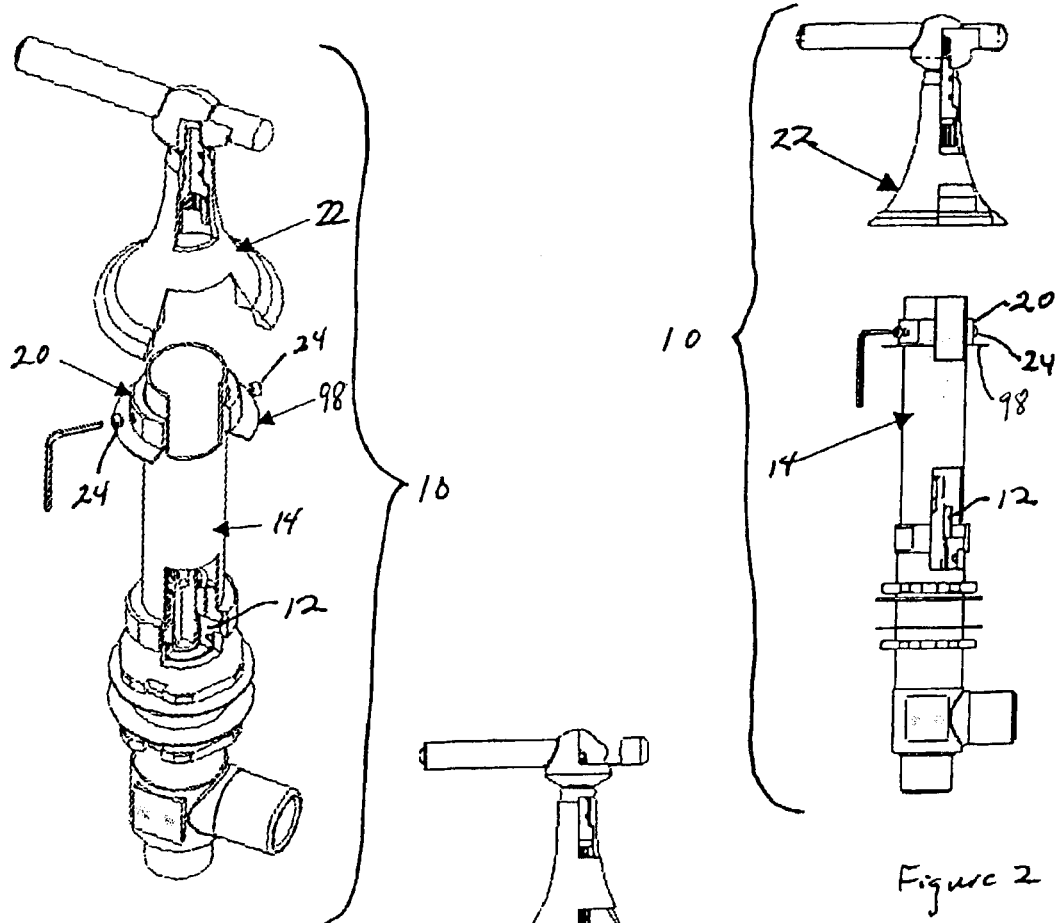
Figure 1
Figure 2
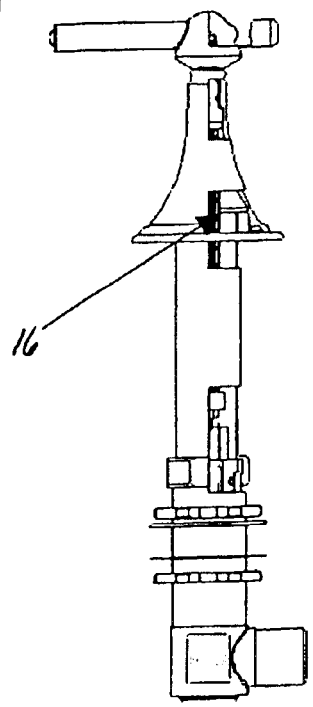
Figure 3

TRIM INSTALLATION HARDWARE

This application claims priority to Provisional Application No. 60/337,009, filed Apr. 30, 2002.

The present invention relates to plumbing hardware and particularly to trim installations. More particularly, the invention relates to trim installations for Roman tubs.

BACKGROUND OF THE INVENTION

Roman tub installations are unique for two reasons. The first is that the plumbing must be installed after the roughed-in tub surround is built but before the decorative surface is applied. This is because once the decorative surface is applied and the tub is installed, there is no access to the internal plumbing.

The second unique feature of a roman tub installation is that, because of lack of access after the installation is complete, the roughed-in plumbing must account for a range of thicknesses of the decorative surface. Typically, a finisher lays on mud and tile to provide a decorative surface. However, the thickness of the mud and tile varies from site to site and from finisher to finisher. Accordingly, the hub and handle assemblies must accommodate varying distances to the control valves.

SUMMARY OF THE INVENTION

The present invention provides a Roman tub installation that easily accommodates varying mud and tile thicknesses and a hub and handle assembly that allows easy installation.

The Roman tub installation includes a hub and handle assembly, a valve, a sleeve coupled to the valve's body, an adapter coupled to the valve's stem and to the hub and handle assembly, and a threaded collar coupled to the sleeve.

The hub and handle assembly includes a hub having a threaded portion for engaging the valve assembly, a handle disposed adjacent the hub, and a stem coupled to the handle. The stem includes a first end configured to engage the valve stem, a threaded second end configured to engage the handle, and a shoulder cooperating with the second end to retain the handle adjacent the hub.

The hub includes an upper shoulder and a lower shoulder with a central bore extending therebetween for receiving the stem. The handle is operatively disposed adjacent the upper shoulder, with the stem shoulder engaging the lower shoulder. The stem shoulder cooperates with the threaded portion of the stem to prevent axial movement of the handle relative to the hub.

Other features and advantages will become apparent from the following description when viewed in accordance with the accompanying drawings and appended claims.

BRIEF DESCRIPTION OF THE DRAWINGS

FIG. 1 is a partially broken away perspective view of Roman tub installation hardware according to the present invention.

FIG. 2 is a side view of the Roman tub installation hardware of FIG. 1.

DETAILED DESCRIPTION OF THE DRAWINGS

Figure 4:
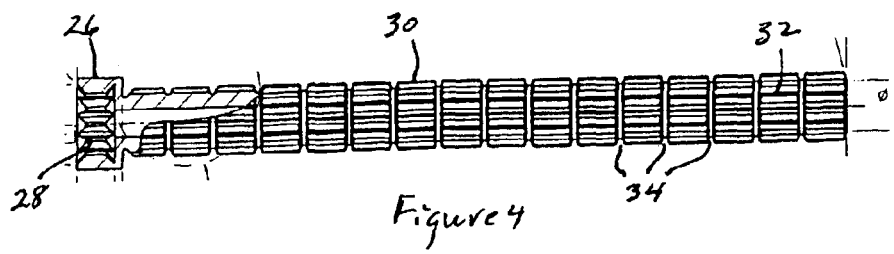
FIG. 4 is a side view of a stem adapter.

A Roman tub installation hardware 10, illustrated in FIGS. 1–3, includes a conventional valve 12, a threaded sleeve 14, a stem adapter 16 and a collar 20. The threaded sleeve 14 threads onto the body of the valve 12 and the stem adapter 16 engages the valve stem and extends into the sleeve 14. The collar 20 is externally threaded and attaches to the outside of the sleeve 14 by a pair of set screws 24. A hub and handle assembly 22 threads onto the threaded collar 20 and simultaneously engages the stem adapter 16 to control the operation of the valve 12.

The stem adapter 16, illustrated in FIG. 4, includes a female broach, or splined socket, 26 having internal splines 28 configured to engage splines on the valve stem. The body 30 of the stem adapter 16 includes a plurality of longitudinally extending splines 32 that replicate the splines on the valve stem. The stem adapter 16 further includes a plurality of circumferential grooves 34. The grooves 34 provide convenient locations for cutting the stem adapter 16 to an appropriate length during installation.

Figure 5:
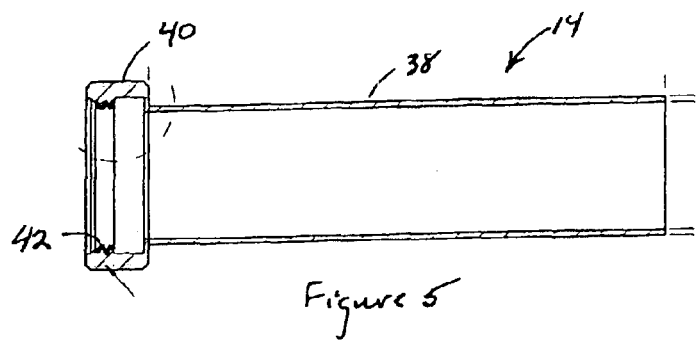
FIG. 5 is section view through a sleeve.
Figure 6:
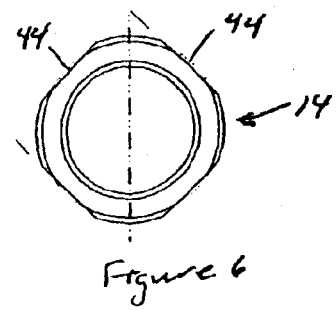
FIG. 6 is an end view of the sleeve of FIG. 5.

The sleeve 14, illustrated in FIGS. 5–6, includes a smooth cylindrical body 38 and a shoulder 40 attached to one end thereof. The shoulder 40 includes internal threads 42 for engaging threads formed on the body of the valve 12, and a plurality of external flats 44 to facilitate installation.

Figure 7:
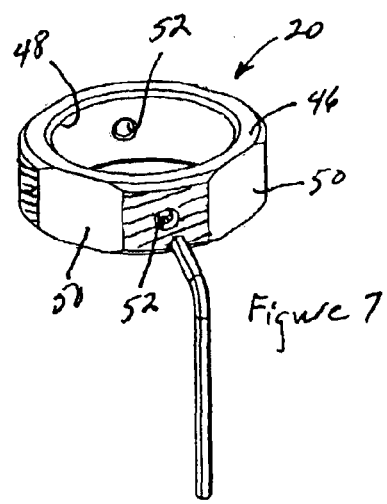
FIG. 7 is a perspective view of a collar.
Figure 8:
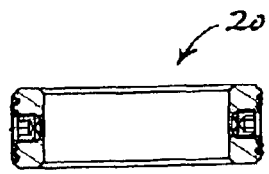
FIG. 8 is a side view of the collar of FIG. 7.

FIGS. 7–8 illustrate the externally threaded collar 20. The collar 20 includes an annular body 46 defining a central aperture 48 configured to receive the sleeve 14 therein. The collar 20 further includes a plurality of flats 50 to facilitate installation and a pair of threaded apertures 52 for receiving set screws 24.

Figure 9:
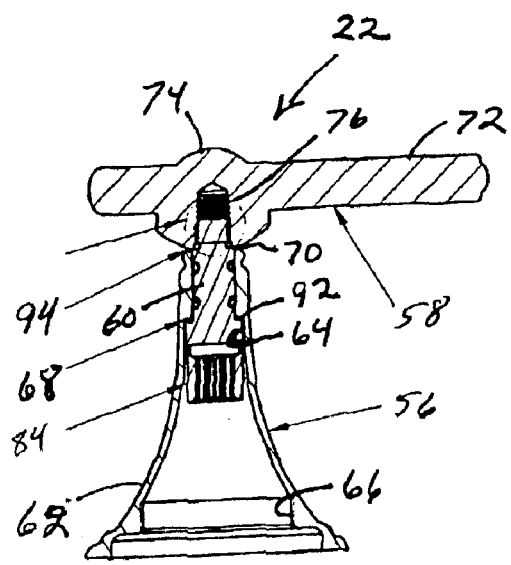
FIG. 9 is a section view of the hub and handle assembly.

The hub and handle assembly 22, illustrated in FIG. 9, includes a hub 56, a handle 58 and a stem 60. The hub 56 includes a shell 62 that defines an upper aperture 64 and a threaded lower aperture 66. The upper aperture 64 extends from an upper shoulder 70 at the top of the shell 62 to an internal shoulder 68.

Figure 10:
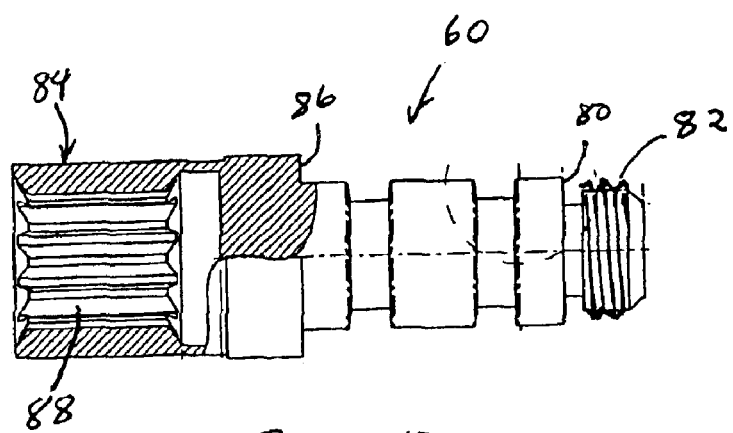
FIG. 10 is a partial section view of the handle stem.

The handle 58 includes a grip portion 72 and a center portion 74 aligned with the upper aperture 64 of the hub 56. The center portion 74 includes a threaded aperture 76. The handle stem 60, illustrated in FIG. 10, attaches the handle 58 to hub 56 and, in cooperation with the stem adapter 16, couples the handle 58 to the valve 12. The stem 60 includes an upper shoulder 80 with a first threaded end 82 extending therefrom, a second end 84, and a lower shoulder 86 disposed between the upper shoulder 80 and the second end 84. The second end 84 includes a female broach 88 configured to engage the stem adapter 16. In preferred embodiments, a lower washer 92 is installed on the lower shoulder 86 and an upper washer 94 is installed on the upper shoulder 80. The first threaded end 82 is screwed into the handle's threaded aperture 76 until the upper washer 94 is compressed between the upper shoulder 80 and the center portion 74 of the handle 58 and the lower washer 92 is compressed between the lower shoulder 86 and the internal shoulder 68 of the shell 62. Preferably, the first threaded end 82 is prevented from backing out of the aperture 76 by a commercially available thread-locking adhesive applied to the threads during installation.

During installation of the rough plumbing, an installer screws the sleeve 14 to the valve body, providing a dam against the mud and tile. After the mud and tile have been installed, the installer removes the sleeve 14, cuts it to the proper length, and reinstalls it on the valve body. The installer then cuts the stem adapter 16 to the proper length and, inserting it into the sleeve 14, engages the valve stem with the adapter's female broach 26. The installer then places a washer 98 (FIGS. 1–2) over the sleeve 14 to rest against the tile surface and slides the collar 20 on the sleeve 14 to rest against the washer 98. The collar 20 is attached to the sleeve 14 by the set screws 24. The hub and handle assembly 22 is installed by clocking the handle 58, that is by aligning the handle 58 to mate with the female broach 88 of the handle stem 60 with the splines 32 of the stem adapter 16, and screwing the hub 56 onto the collar 20 until the center portion 74 of the handle 58 is disposed adjacent the hub 56.

The above-described embodiments, of course, are not to be construed as limiting the breadth of the present invention. Modifications and other alternative constructions will be apparent which are within the spirit and scope of the invention as defined in the appended claims.

What is claimed is:

1. A Roman tub installation comprising:
   a hub;
   a handle;
   a valve having a valve body and a valve stem;
   a sleeve coupled to the valve body;
   an adapter coupled to the valve stem and to the handle; and
   a threaded collar coupled to the sleeve, the hub threadedly engaging the collar.

2. The installation of claim 1 wherein the handle includes a female broach for engaging the adapter.

3. The installation of claim 2 wherein the handle includes a stem, the female broach being formed on the stem.

4. The installation of claim 1 wherein the handle includes a stem having means for retaining the handle on the hub.

5. A hub and handle assembly for operating a valve assembly, the hub and handle assembly comprising;
   a hub having a threaded portion for engaging the valve assembly;
   a handle disposed adjacent the hub; and
   a stem coupled to the handle and including a first end configured to engage a valve stem, a second end configured to engage the handle, and a shoulder cooperating with the second end to retain the handle adjacent the hub, wherein the second end includes a threaded portion for engaging a threaded aperture in the handle.

6. The assembly of claim 5 wherein the hub includes an upper shoulder and a lower shoulder with a central bore extending therebetween for receiving the stem, the handle being operatively disposed adjacent the upper shoulder, with the stem shoulder engaging the lower shoulder and cooperating with the threaded portion of the stem to prevent axial movement of the handle relative to the hub.

7. A hub and handle assembly for operating a valve assembly, the hub and handle assembly comprising:
   a hub having a threaded portion for engaging the valve assembly;
   a handle disposed adjacent the hub; and
   a stem coupled to the handle and including a first end configured to engage a valve stem, a second end configured to engage the handle, and a shoulder cooperating with the second end to retain the handle adjacent the hub wherein the valve assembly includes a valve body, a sleeve coupled to the valve body, and a collar coupled to the sleeve, the threaded portion of the hub engaging the collar.

8. A Roman tub installation comprising;
   a hub having a threaded portion;
   a handle;
   a handle stem coupled to the hub and the handle;
   a valve having a valve body and a valve stem;
   means coupled to the valve for engaging the threaded portion of the hub and retaining the hub in position relative to the valve body; and
   means for coupling the handle stem to the valve stem, wherein the means for engaging and retaining includes a cylindrical sleeve having a first end coupled to the valve body.

9. The installation of claim 8 wherein the means for engaging and retaining further includes a threaded collar disposed on the cylindrical sleeve for engaging the threaded portion of the hub.

10. A Roman tub installation comprising:
    a hub having a threaded portion;
    a handle;
    a handle stem coupled to the hub and the handle;
    a valve having a valve body and a valve stem; means Coupled to the valve for engaging the threaded portion of the hub and retaining the hub in position relative to the valve body; and means for coupling the handle stem to the valve stem, wherein the means for coupling includes a stem adapter having a male broach for engaging the handle stem and a female broach for engaging the valve stem.

11. A method of installing a hub and handle assembly on a Roman tub installation having a valve with a valve body and a valve stem, the method comprising the steps of:
    providing a sleeve having a first end and a second end;
    coupling the first end to the valve body;
    providing a stem adapter having a first end configured to engage the valve stem and a second end;
    inserting the stem adapter into the sleeve and engaging the valve stem with the stem adapter first end;
    providing a threaded collar;
    coupling the threaded collar to the sleeve near the second end of the sleeve;
    providing a hub coupled to a handle, the hub having a threaded portion and the handle including a handle stem; and
    mating the stem adapter second end with the handle stem while screwing the hub threaded portion onto the threaded collar.

* * * * *